US011912556B2

(12) United States Patent
McGushion

(10) Patent No.: US 11,912,556 B2
(45) Date of Patent: Feb. 27, 2024

(54) METHODS, SYSTEMS AND DEVICES FOR PROTECTING A SURFACE OF A CONTAINER FROM EXPOSURE TO ADDITIVES

(71) Applicant: Kevin D. McGushion, Simi Valley, CA (US)

(72) Inventor: Kevin D. McGushion, Simi Valley, CA (US)

( * ) Notice: Subject to any disclaimer, the term of this patent is extended or adjusted under 35 U.S.C. 154(b) by 60 days.

(21) Appl. No.: 17/571,195

(22) Filed: Jan. 7, 2022

(65) Prior Publication Data

US 2022/0212910 A1 Jul. 7, 2022

Related U.S. Application Data

(60) Provisional application No. 63/134,916, filed on Jan. 7, 2021.

(51) Int. Cl.

*B67C 3/20* (2006.01)
*B67C 3/24* (2006.01)
*B67C 7/00* (2006.01)

(52) U.S. Cl.

CPC .............. *B67C 3/208* (2013.01); *B67C 3/204* (2013.01); *B67C 3/24* (2013.01); *B67C 7/0006* (2013.01); *B67C 2007/006* (2013.01); *B67C 2007/0066* (2013.01)

(58) Field of Classification Search

CPC ........... B67C 3/208; B67C 3/204; B67C 3/24; B67C 3/20; B67C 7/0006; B67C 7/00; B67C 2007/006; B67C 2007/0066

See application file for complete search history.

(56) References Cited

U.S. PATENT DOCUMENTS

| | | | | | |
|---|---|---|---|---|---|
| 5,566,733 | A * | 10/1996 | Germain | B65B 3/34 141/192 |
| 6,551,638 | B1 * | 4/2003 | Dodd | B65D 85/73 426/106 |
| 7,114,535 | B2 * | 10/2006 | Hartness | B67C 3/24 141/180 |
| 9,433,230 | B1 * | 9/2016 | Fisher | A23G 9/20 |
| 10,368,561 | B1 * | 8/2019 | Benson | B65D 81/24 |
| 2019/0389710 | A1 * | 12/2019 | Hayakawa | B67C 3/02 |

* cited by examiner

*Primary Examiner* — Andrew M Tecco
(74) *Attorney, Agent, or Firm* — Aaron P. McGushion

(57) ABSTRACT

The present specification discloses a method of protecting an inner wall surface of a vessel from damaging interaction with an additive added to the vessel, where the method includes providing the vessel at least part way filled with a liquid product; applying a force on the vessel the force being configured to create a change in shape of a surface of the liquid product; and providing sufficient containment of the additive by the change in shape of the surface of the liquid product to substantially prevent damaging interaction between the inner wall surface of the vessel and the additive for at least an additive reaction time period at the end of which the additive is rendered substantially incapable of producing damaging interaction to the inner wall surface of the vessel.

15 Claims, 4 Drawing Sheets

METHODS, SYSTEMS AND DEVICES FOR PROTECTING A SURFACE OF A CONTAINER FROM EXPOSURE TO ADDITIVES

CROSS-REFERENCE TO RELATED APPLICATION

This patent application claims the benefit of U.S. Provisional Patent Application Ser. No. 63/134,916, entitled "Methods, Systems and Devices for Protecting a Surface of a Container from Exposure to Additives," filed Jan. 7, 2021, which application is incorporated in its entirety here by this reference.

BACKGROUND

The subject of this patent application relates generally to methods, systems and devices for use in the introduction of additives to a container with a fluid therein for protecting the container from the deleterious effects of the additive.

By way of background, when filling a container with a fluid, one or more additive materials and/or one or more secondary materials can be added to the container before, during, and/or after the filling process. However, additive materials or secondary materials may cause damage to the container, especially the inner wall, due to the pH of the material, the temperature of the material, the abrasive nature of the material, and/or other deleterious qualities of the material.

In one example filling procedure, in canning operations, such as the canning of beverages (e.g., wine, juice, energy drinks, etc.), one or more additives (such as a cryogenic additive) may be added directly to the liquid beverage during (or near in time to) filling. Alternatively, the cryogenic additive can be added to the container just prior to filling. The cryogenic additive changes state to a gas for the primary purposes of pressurizing the container and displacing the oxygen. Once the lid is sealed in place, the additive continues to boil or sublimate to a gas, resulting in pressurized gas being trapped within the container for maintaining the structure of the container (such as a standard aluminum can or the like) for transport, storage, and for purchasing by the consumer.

However, the cryogenic additive contributes to an undesirable flavor to the beverage due to interactions between the cryogenic additive and the container walls, and, afterwards the beverage's interaction with the damage caused by the cryogenic additive. Means for preventing adverse reactions between the container and the cryogenic additive are therefore needed.

Aspects of the present methods, systems, and devices fulfill these needs and provide further related advantages as described in the following summary.

SUMMARY

Aspects of the present invention teach certain benefits in construction and use which give rise to the exemplary advantages described below.

The present specification discloses a method of protecting an inner wall surface of a vessel from damaging interaction with an additive added to the vessel, where the method includes providing the vessel at least part way filled with a liquid product; applying a force on the vessel the force being configured to create a change in shape of a surface of the liquid product; and providing sufficient containment of the additive by the change in shape of the surface of the liquid product to substantially prevent damaging interaction between the inner wall surface of the vessel and the additive for at least an additive reaction time period at the end of which the additive is rendered substantially incapable of producing damaging interaction to the inner wall surface of the vessel.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the at least one non-limiting embodiment of present invention. In such drawings.

The above-described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
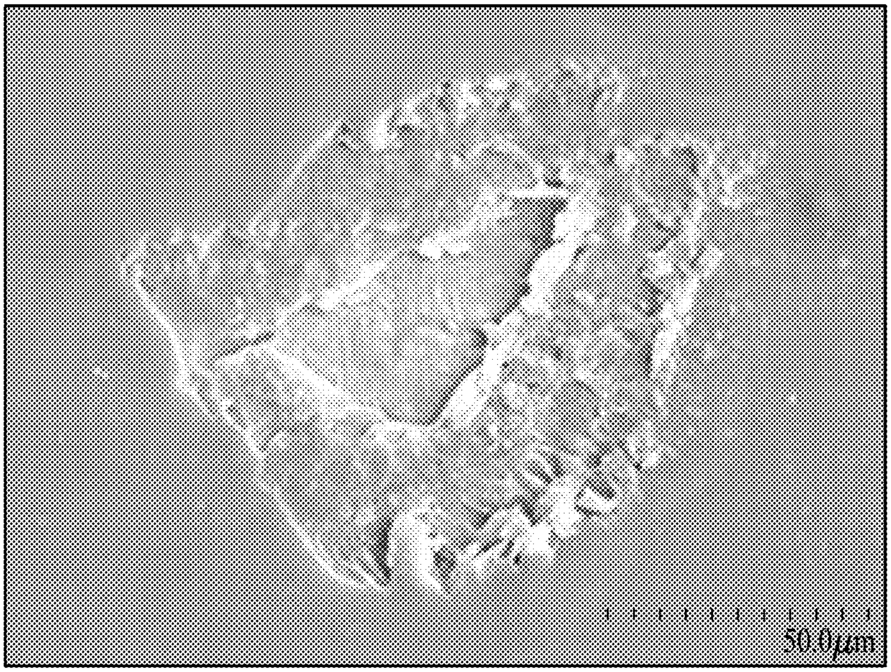
FIG. 1 is a microscopic image taken with a scanning electron microscope of one of the numerous pits formed on the wall portion of an aluminum can filled using existing filling techniques and equipment, due to direct or proximal exposure to a cryogenic additive.
Figure 2:
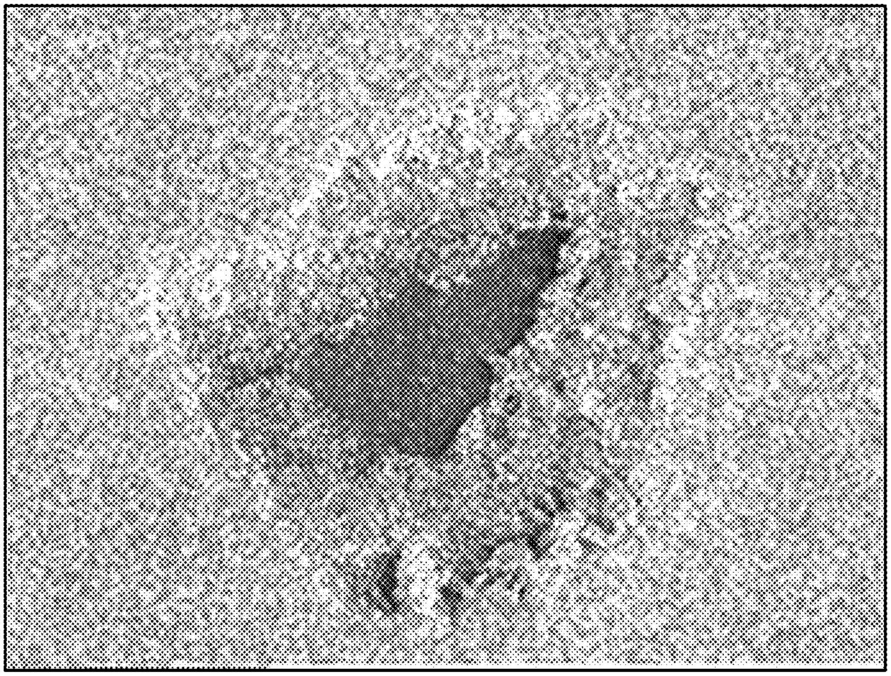
FIG. 2 is a microscopic image taken a scanning electron microscope with energy dispersive x-ray analysis of the pit of the wall portion of FIG. 1.
Figure 3:
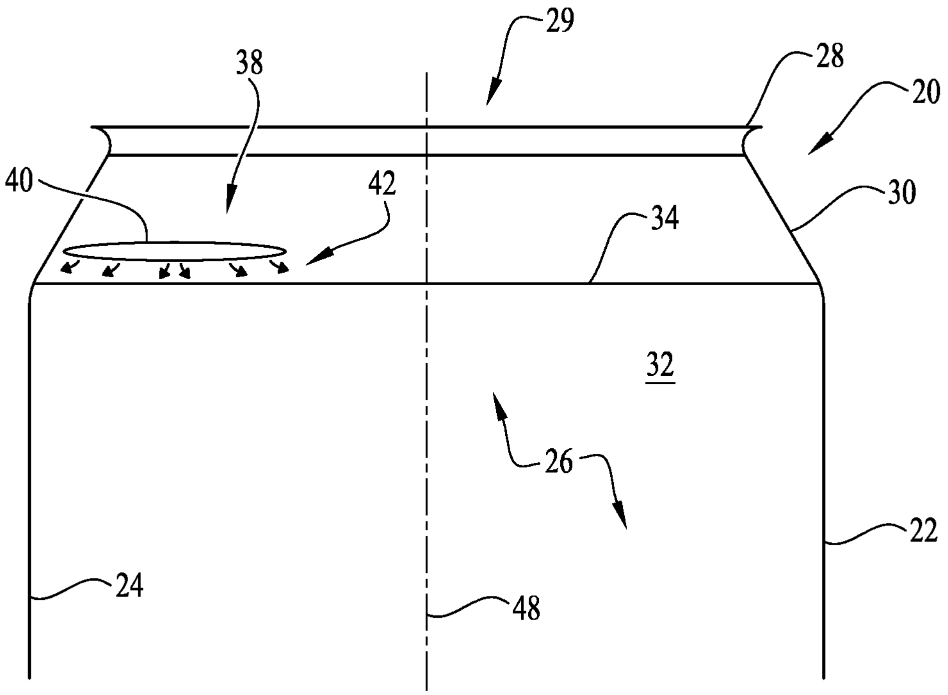
FIG. 3 is a schematic side cross-sectional view of an example beverage can filled with a liquid product with a cryogenic additive on top of the liquid, with the beverage can in a non-rotating state.

Looking first at FIGS. 1-2, views of a damaged portion of a standard aluminum beverage can are disclosed which, in this example, was filled with wine and pressurized and at least partially deoxygenated by depositing a liquid cryogenic additive, such as liquid nitrogen, using existing filling technology. The damaged portion of the wall illustrates pitting or microscopic fractures (or other damage) of the protective coating or liner applied to the inner wall of the aluminum can, such as a polymer or epoxy lining. The damage to the integrity of the protective coating exposes the bare aluminum underneath and permits the beverage to interact with the aluminum for an extended period of time. When canning an acidic beverage (e.g., with a pH between 3 and 4), such as wine or certain juices, the chemical reaction between the exposed aluminum and the beverage can impart a "tinny"

and/or sulfur taste and odor to the beverage. Further, depending on the beverage, storage time, and other factors, the structural integrity of the can be degraded, causing failure of the can. Damage to the protective coat may also cause undesirable interactions between the contained fluid and the wall, even when containing non-acidic fluids.

The damage to the protective liner is caused by contact with or being in close proximity with the cryogenic liquid additive, which at −320 degrees Fahrenheit causes an increase in brittleness, stiffness and rigidity of the polymer lining. Because the coefficient of thermal expansion of aluminum (and other various metal container materials) greatly differs from that of the polymer lining and the polymer lining is bonded to the aluminum, the extreme cold of the cryogenic additive causes fracturing of the polymer lining in small localized regions while it is in the glass phase due to substantially greater reduction in volume of the aluminum material within this localized region. Additionally, once a can is sealed and as the remaining cryogenic liquid boils off, pressurizing the internal volume, the can is inflated outwardly causing additional stress on the brittle lining.

Even if the cryogenic liquid additive is deposited into the beverage at the center of the can (i.e., furthest from the wall), the cryogenic liquid additive (such as liquid nitrogen) is highly mobile due to the cryogenic liquid boiling and producing a vapor, which drives the rapid movement of the cryogenic liquid and holds the droplets and pools of cryogenic liquid above the surface of the beverage on a cushion of vapor, also known as the Leidenfrost effect. Additionally, when the cryogenic liquid hits the room temperature beverage, there is a furious bubbling and spitting as the cryogenic liquid boils explosively. The high mobility and the spitting of the cryogenic liquid makes it highly likely to interact with the wall of the aluminum can, causing numerous points of damage to the protective coating all around the wall at and above the fill line.

Figure 6:
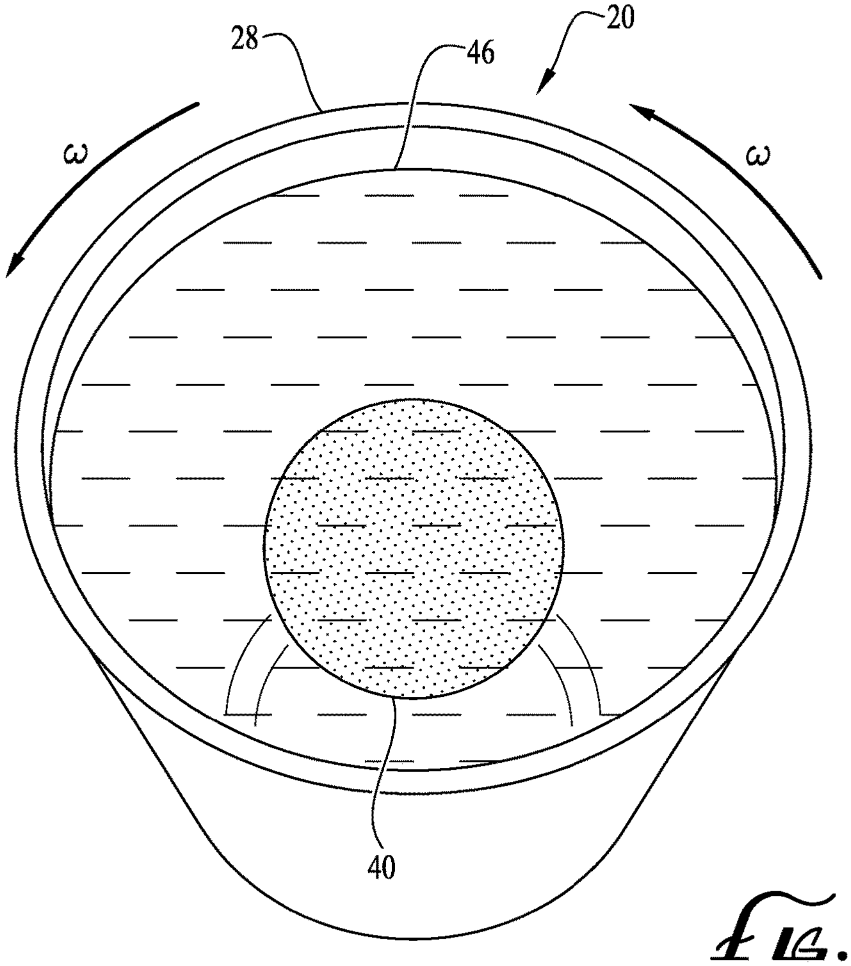
FIG. 6 is a top perspective view of the example beverage can of FIG. 3, filled with a liquid product with a cryogenic additive on top of the liquid, with the beverage can in a rotating state.
Figure 7:
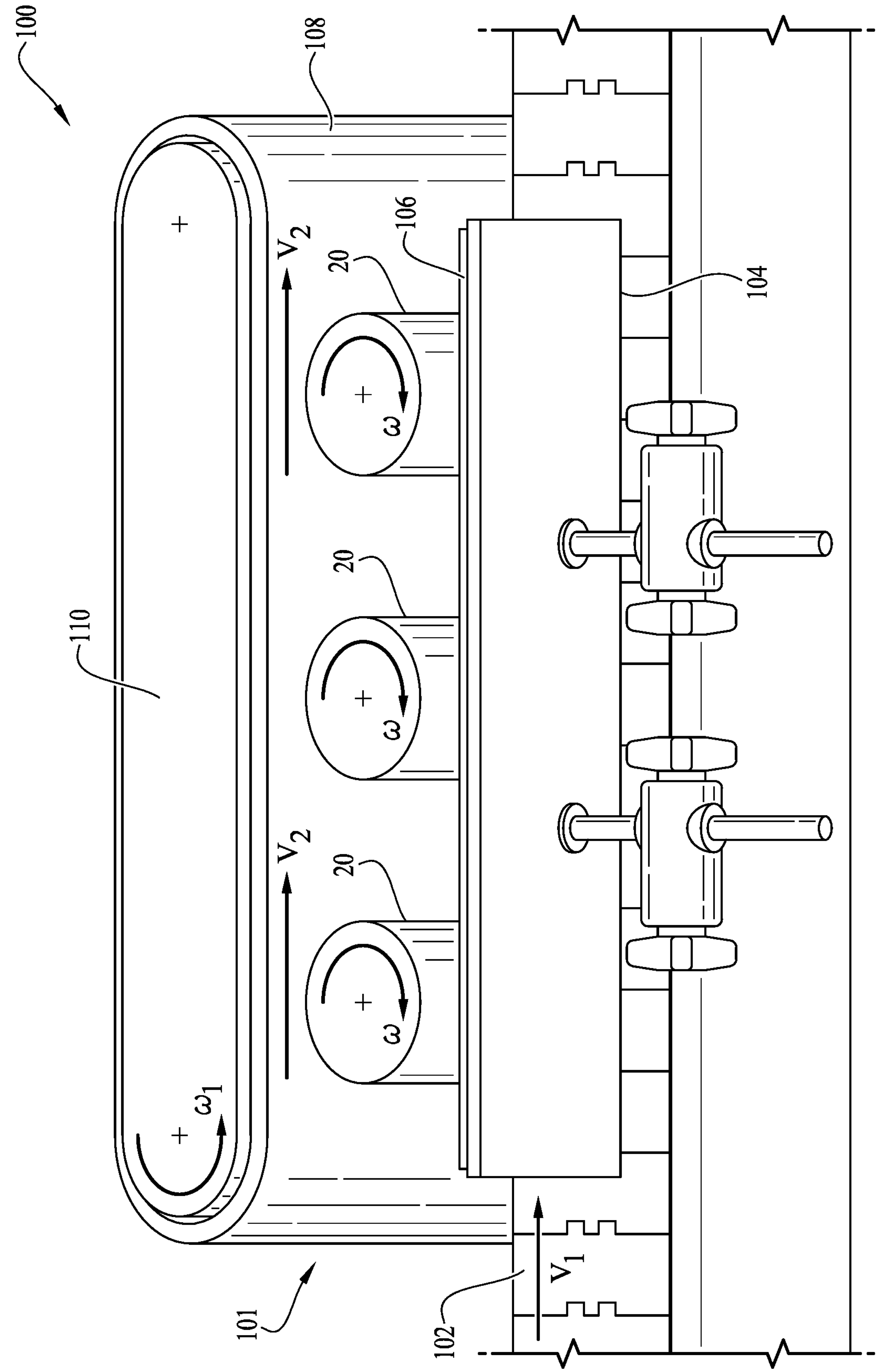
FIG. 7 is a top perspective view of exemplary canning line equipment for rotating the cans.

Still looking at FIGS. 1-2, the fracture in the protective lining includes a jagged edge with polymer plastic material missing. The missing polymer material was likely ejected into the beverage. The fracture exposes beverage to the underlying aluminum wall. When exposed to the acidic beverage, a black scale is formed at the point of contact and the protective lining is separated around this reaction area. FIG. 6 shows the breach using scanning electron microscope; and FIG. 7 shows the material composition in the breach area using energy dispersive X-ray spectroscopy (EDX). The darker portions are the exposed aluminum surrounded by the original and damaged portions of the polymer lining. The aluminum of the can is fully exposed to the fluid in these darker regions. Further, significant amounts of aluminum material has migrated out in the chemical process and coating parts of the polymer lining. In this chemical process, many undesirable compounds can be created, including compounds containing aluminum. Additionally, the acidic beverage can migrate under the protective liner to react with additional surface area of the aluminum beyond the material directly exposed.

Looking at FIGS. 3-7, example embodiments of the present method, system, and devices can be seen. A schematic view of a vessel 20 (which may also be referred to herein as a can or container, as an example of a vessel), which in this example embodiment is a standard aluminum can, illustrated without the lid (where the lid is a standard lid known in industry with a drink opening selectively pried open by a stay-on tab by applying a force to the opening panel defined by a score line). Although a cylindrical aluminum can is illustrated, a wide variety of various vessels of varying sizes and shapes are compatible with the present methods, systems, and devices, such as steel cans, plastic vessels, or any other vessel where it is advantageous to prevent interaction between the inner wall of the vessel and the secondary material being added to the fluid product held within the vessel and/or for purging/displacing oxygen from the empty space between the fluid product and the lid. The vessel 20 is at least partially filled with a fluid product, which can include, in a non-limited list of examples, a flowable medium, such as a liquid, a slurry, a liquid with chunks of solid material, and other products which are in a temporary or permanent flowable state, including foods with a liquid component (e.g., soups, meal replacement drinks and shakes, and the like) and nonedible fluid products (e.g., fluid products used in industry).

A secondary material is added to the vessel, generally after at least some or all of the fluid product is added to the vessel; although, the secondary material can be added prior to adding any of the fluid product or some portion of the fluid product (e.g., a first component of a fluid product may be added before a second component, such as a broth component before a vegetable and/or noodle component or a water component before a syrup and/or concentrate component, and so on). Although the secondary material is named as such, the name secondary material does not necessarily indicate its importance relative to the fluid product and components thereof, and may be a component in itself, such as a necessary ingredient of the fluid product that causes damage to the container which must be mitigated. Or, the secondary material can be an additive which improves, and/or preserves the fluid product, or otherwise causes change in the fluid product. The secondary material in the present example is a cryogenic material (which may also be referred to herein as a cryogenic additive or a liquefied gas).

FIG. 1 illustrates non-rotating vessel or can 20, which can illustrate either a standard method of filling a can or one example of an initial step of the present method, where the additive 38 is added prior to rotating the can 20. The example can 20 is a standard aluminum can with a wall 22 with an inner wall surface 24 defining an interior space 26 for containing the fluid product 32 (a beverage in this example embodiment), with a necked portion 30 that tapers to terminate at the rim 28 defining an opening 29 at the top of the can 20. The interior wall surface 24 is lined with the protective coating or lining, such as the polymer or epoxy lining or the like described herein, to prevent interaction between the beverage and the aluminum of the can 20. Although it is not shown, a lid with a drink opening that is configured to be selectively pried open by a stay-on tab, commonly known in industry, by applying a force to the opening panel (tab or cantilevered tab) defined by a score line. The lid is sealed to the rim 28 of the can 20 during a seaming operation which curls and compresses the rim 28 and the lid perimeter into a double seam, sealing the two together in an airtight and watertight configuration.

The example aluminum can 20 is generally cylindrical in shape and includes a longitudinal axis 48 of the cylinder. In this example embodiment, the secondary material 38 is a cryogenic additive (liquid nitrogen in this case). The cryogenic additive 40 is deposited into the opening 29 of the can 20 atop the fluid product 32. The packaging line can include a cryogenic doser nozzle movable in substantial unison with the vessel 20 when adding the cryogenic liquefied gas 40 to the liquid product 32 (see also, FIG. 7, which illustrates exemplary equipment for rotating cans as they are transported on the packaging line conveyor belt). A gas cushion 42 of evaporated cryogenic additive (with the lifting and propulsive action of the gas represented by arrows) quickly forms and causes the cryogenic additive 40 to become mobile, increasing the likelihood of undesirable contact with the interior wall surface 24, if the can 20 remained insufficiently rotated. If the can 20 is rotated about the longitudinal axis 48 shortly before, during or shortly after depositing the cryogenic additive 40, the flat surface 34 of the fluid product 32 will quickly transform into a concave fluid surface 36 due to the can imparting a rotational motion on the fluid product 32, being shaped under the influence of gravity and centrifugal force.

Figure 4:
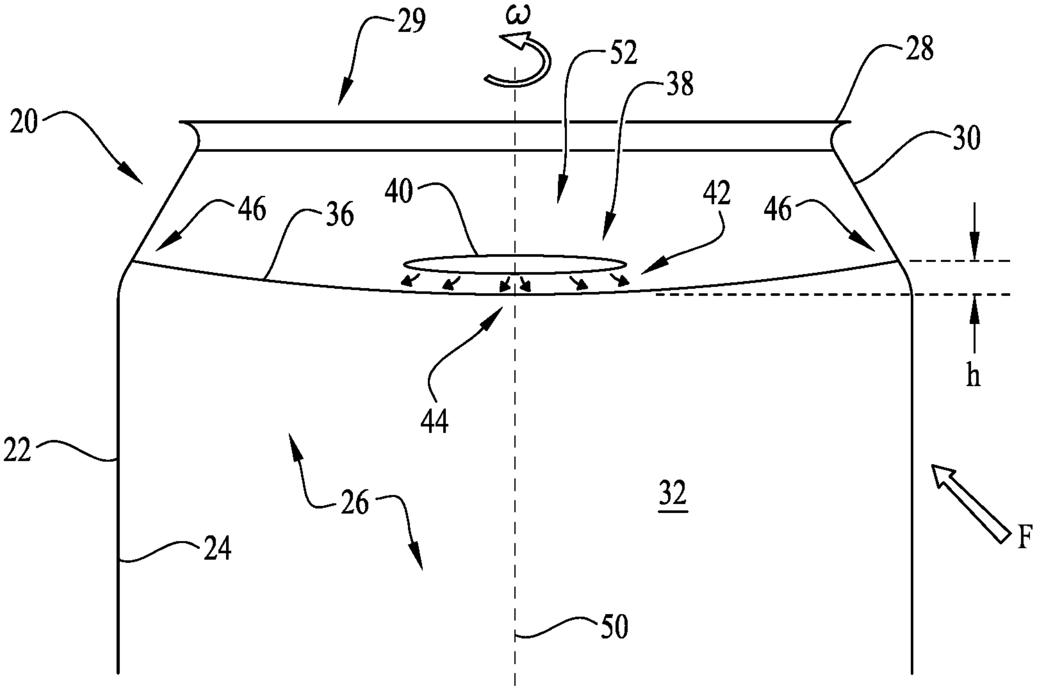
FIG. 4 is a schematic side cross-sectional view of the example beverage can of FIG. 3, in a rotating state.

In FIG. 4, the can 20 is rotated at an angular speed ω by force F incident on the can 20 (anywhere on the can 20) with at least one force component configured to impart a torque on the can 20 to create the concave fluid surface 36 approximately in the form of a paraboloid of revolution in this example. It can be seen that the cryogenic additive 40, floating on the near-frictionless vapor cushion layer, settles at the lowest region 44 of the concave fluid surface 36, due to its inability to climb the slope of the concave fluid surface 36. Depending on the type of secondary material 38 added to the fluid product 32, other non-cryogenic materials may exhibit similar behavior of settling at the lowest region 44 of the concave fluid surface 36, even if the material is floating on or suspended in and directly contacting the fluid product 32.

Looking at the height difference h between the lowest region 44 and the highest region 46 (about the perimeter) of the concave fluid surface 36 within a can 20, the height difference h varies according to the angular speed w, and can be at least 0.5 mm. Greater height differences may be required, depending on the diameter of the vessel 20, the viscosity and other properties of the fluid product 32 and the secondary material 38. Generally, the faster the angular speed w, the greater the height difference h.

The height difference h need not necessarily be constant, as the jostling, the transport, and transitioning from one canning process to another in a canning line may include brief changes in the angular speed ω. Further, the line may include periods of time where the angular speed ω is increasing in spin-up time periods, or when the force F is briefly removed (and thereafter continued) resulting in a temporary halt or slowing in the can's 20 angular speed ω in dwell times, or when the spinning process is complete and the force F is permanently removed yet the change in shape of the surface of the liquid product persists at least in part for a residual time period. During the dwell period, a manufacturing action can be applied to the can, such as a seaming process, a printing or labeling process, a rinsing process, or other processes (e.g., applying a lid to the vessel, transitioning the vessel from a conveyor to a lid sealing machine where a lid is sealed to the vessel to seal the liquid product within the vessel, and transitioning the vessel from the lid sealing machine to the conveyor) where the force F can be removed to perform the process and continued after the process in complete. The can 20 may be spun up, where the angular speed ω is temporarily increased just prior to a dwell period to increase the height difference h so that the cryogenic additive will continue to be isolated from the wall surface 24 within or nearby the lowest region 44.

In one or more example methods, the can 20 is rotated before, during and after (intermittently or continuously) depositing the cryogenic additive 40 into the can 20, for the purpose of providing sufficient containment of the cryogenic additive 40 by the change in shape of the surface 36 of the liquid product 32 to substantially prevent damaging interaction between the inner wall surface 24 of the can 20 and the cryogenic additive 40 for at least an additive reaction time period, at the end of which the cryogenic additive 40 is rendered substantially incapable of producing damaging interaction to the inner wall surface 24 of the can 20. In one or more embodiments, substantially preventing damaging interaction between the inner wall surface 24 of the can 20 can mean that the damage created by the cryogenic additive 40 is, for example, negligible surface damage that is not likely to contaminate the liquid product 32, and/or significantly damage the integrity of the can 20, and/or the contamination and/or damage is within quality and/or safety guidelines.

In one or more example embodiments, during the additive reaction time period, the can 20 initially has no lid attached and the cryogenic additive 40 changes phase to a gas while the lid is off. The rotation of the can 20 and the fluid product 32 causes the gas emitted from the cryogenic additive 40 to swirl in a vortex-like pattern, which tends to effectively sweep up and displace most or all of the oxygen present in the headspace 52, below the rim 28 and above the surface 36 of the fluid product. The gas vortex formed by the rotation of the can 20, which is a nitrogen gas in this example embodiment, is an inert gas that tends to sweep out or flush the undesirable gases in a purging process from the headspace 52, including the overhang beneath the rim 28 formed by the necked portion 30. Thus, the oxygen, or other unwanted gases or airborne particles, are displaced from the surface 36 and potentially removed from the headspace 52. The lid, not shown, is applied to the rim 28 and sealed thereto (i.e., by use of a seaming chuck and seaming roll to create a double seam with sealing compound between the rolls, as is known in industry) during the evaporation (or sublimation) of the cryogenic gas 40, potentially removing most or all of the undesirable gases in the headspace 52 before the lid is sealed to the can 20.

Once the lid is sealed to the can 20 the cryogenic additive 40 continues to evaporate, thereby pressurizing the can interior 26 to approximately 15 to 30 psi. Furthermore, some gases produced by certain cryogenic additives 40 are heavier than air and thus displaces any remaining oxygen on the surface of the beverage, so that, when the can is substantially upright, the inert gas forms a layer atop the beverage surface that substantially prevents contact between the beverage and the oxygen. In one or more embodiments, multiple additives can be added to the beverage. A second additive may include oxygen absorbing or scavenging materials known in industry.

In one or more embodiments, the additive reaction time period is the amount of time required for a majority or substantially all of the cryogenic additive 40 to change phase into a gas (where any remaining cryogenic additive 40 at cryogenic temperatures, if any, is insufficient to create substantially damaging interaction with the can 20). In one or more embodiments, the additive reaction time period is the amount of time required for at least 50% of the cryogenic additive changes phase into the gas.

In one or more embodiments, the additive reaction time period is at least 4 seconds.

In one more embodiments the sufficient angular speed of the vessel is at least 0.25 revolutions per second, or the sufficient angular speed of the vessel is at least 0.5 revolutions per second.

Figure 5:
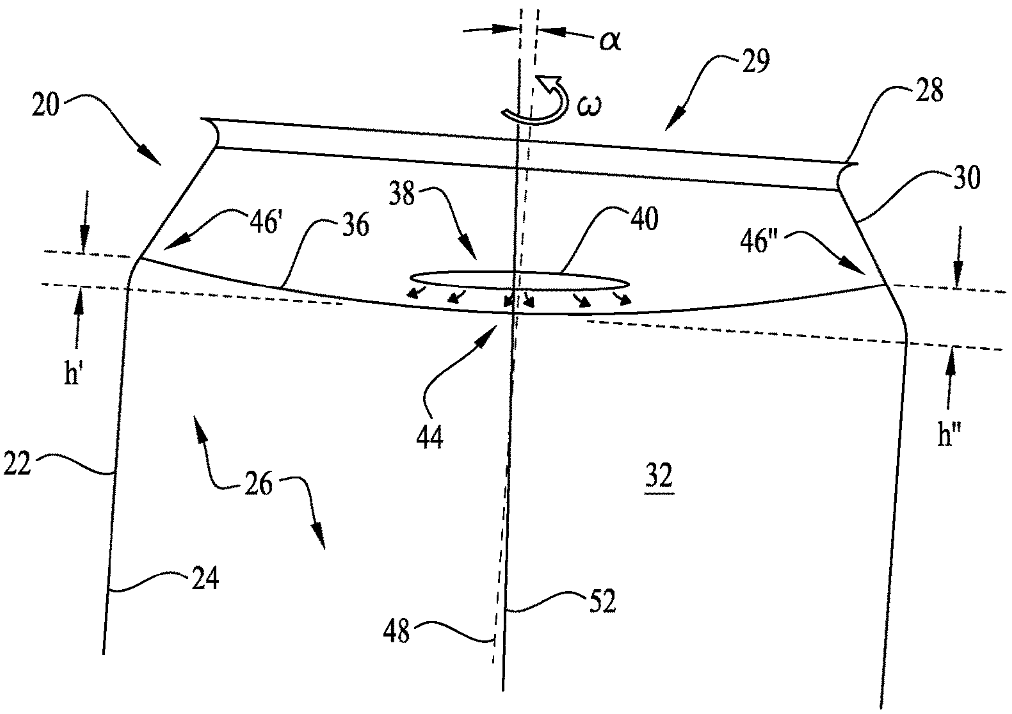
FIG. 5 is a schematic side cross-sectional view of the example beverage can of FIG. 3, in a rotating state with the beverage can slightly tilted with respect to the direction of gravity.

In one or more example embodiments, the can 20 is tilted relative to gravity at a tilt angle α, such that the longitudinal axis 48 is tilted relative to the vertical line 52 that is parallel with the direction of gravity. As can be seen in FIG. 5, when the can 20 is rotated with the angular speed ω about the tilted axis, the fluid product 32 still forms the concave fluid surface 36. However, the shape of the concave fluid surface 36 may differ somewhat compared to the vertical orientation illustrated in FIG. 4, since the concave fluid surface 36 is bounded by an elliptical wall section rather than a circular wall section. Because of the tilt, it can be seen that the height difference h' (on the high side) is smaller than the height difference h" (on the low side), yet the cryogenic additive 40 still positioned at or near the lowest region 44, since both the highest region 46' and the highest region 46" are still higher than the lowest region 44.

In one or more embodiments, the can 20 is positioned on a conveyor of a packaging line with the outer bottom surface of the can 20 resting on the conveyor, where the torque is applied to the can 20 by a portion of the conveyor system contacting the outer surface of the wall 22 to rotate the can 20. An example portion of a packaging line can be seen in FIG. 7, illustrating a rotating accessory 100 for imparting a rotation on a plurality of cans 20 traveling on a conveyor belt 102 inline within the standard packaging line (not illustrated). In one or more embodiments, and as described briefly above, the cryogenic doser nozzle (not illustrated) can be movable in substantial unison with each of the cans 20 when dosing each can 20, as the can 20 is rotated.

In this example rotating accessory 100, the conveyor belt 102 linearly moves the cans 20 into a spinning apparatus 101 that includes a vertically oriented belt 108 (i.e., the major surface of the belt that contacts the sidewall of the cans 20 is substantially vertical) wrapped about a drive drum assembly 110. A stationary wall 104 having a friction pad 106 applied thereto is mounted to the rotating accessory 100 substantially parallel planar to and spaced apart from the vertically oriented belt 108, with sufficient spacing to permit the cans 20 to travel therebetween. The cans 20 are positioned between and contacting both the vertically oriented belt 108 and the stationary wall 104, with the vertically oriented belt 108 rolling the cans 20 on the friction pad 106 due to the vertically oriented belt 108 being rotated at an angular speed $\omega_1$ the vertically oriented belt 108 travels at a velocity of $v_2$ compared to the conveyor belt velocity of $v_1$. In one or more embodiments, the vertically oriented belt velocity $v_2$ is greater than, equal to, or less than the conveyor belt velocity $v_1$. In this example process, the cans 20 are fed into the rotating accessory 100, where the vertically oriented belt 108 rolls the cans 20 against the friction pad 106 of the stationary wall 104 to obtain the angular speed ω of the cans 20 required to create the approximate paraboloid of revolution needed to prevent damaging interaction between the cryogenic additive 40 and the inner wall surface 24 of the can 20. Although the example rotating accessory 100 is illustrated as being an example length with three example cans 20, the rotating accessory 100 can be significantly longer to accommodate a large number of cans 20 being simultaneously rotated for a sufficient time. In one or more embodiments, there can be two or more rotating accessories 100 arranged in-line side-by-side or spaced apart, where each of the vertically oriented belts 108 can be rotated at the same or differing speeds, depending on the requirements of the canning process at each point along the conveyor belt 102.

In one or more embodiments, an example conveyor system is oriented at a downhill angle such that the cans 20 roll relative to the conveyor, leaning and rolling on a lateral rail or portion of the conveyor tilted at the tilt angle α, to produce the concave fluid surface 36. In one or more embodiments, the tilt angle α is at least 1°.

In one or more embodiments of yet another alternate device and/or method, involves oscillating the can 20 with a wave source or vibration source to create a wave action which propagates from the wall 22 of the can 20 inwardly to the center. This action would be optimized in amplitude and frequency so that it sequesters the cryogenic additive, not allowing it to come in contact with the can liner. In one or more embodiments, wave action is induced from the perimeter of the can with either a contact or contactless vibration or sound at a frequency designed to sequester the cryogenic additive in the center or at least prevent it from contacting the can inner liner.

Instead of the application of a force F imparting a torque on the can 20 for rotating the can, the force F is from a vibration source (e.g., from an actuator or the like) that imparts a vibration on the can 20 at a magnitude and a frequency sufficient to produce the change in shape of the surface of the liquid, wherein the change in shape produces one or more waves. The waves produced can be one or more standing waves, a plurality of concentric waves, and a plurality of azimuthal waves having a wave amplitude sufficient to contain the additive 40, substantially preventing contact with the inner wall surface 24 of the can 20. In one or more embodiments, one or both of the frequency and the amplitude are of the vibration source are adjusted during the additive reaction time period. In one or more embodiments, the actuator that directly imparts the vibration on the vessel and/or the actuator indirectly imparts a vibration on one or more portions of a packaging line. There can be multiple actuators along the line to maintain the waves on the fluid product surface within the can 20. In one or more example embodiments, the actuators can impart a vibration to the can 20 while the can 20 is spinning about the cylindrical axis 48 to augment the change in shape of the surface of the liquid product 32, for example during a dwell period where the torque producing force is not applied. Further, the can 20 can be both spun by the torque producing force and the vibration producing force simultaneously.

FIG. 6 illustrates a can 20 being rotated about the cylindrical axis at an angular speed ω. It can be seen (in conjunction with FIG. 4) that the pool of cryogenic additive 40 is positioned in a central region at the lowest region 44 of the concave fluid surface 36. The cryogenic additive 40 remains trapped at the lowest region 44 for the duration of the additive reaction time period, at the end of which the additive is rendered substantially incapable of producing damaging interaction to the inner wall surface of the vessel.

The additive can be chosen from a number of appropriate chemicals and/or compositions. One group of additives can include cryogenic materials, such as low temperature materials that change state (e.g., evaporation or sublimation) upon exposure to the higher temperatures within the beverage can 20 and/or the atmosphere. Examples of cryogenic materials include liquid argon and liquid nitrogen.

In one or more embodiments of an alternate device, all or portions of the can 20 inner wall surface 24 is treated with a cryogenically resistant material. In one example, the wall 22 at and/or near the beverage fill line is coated or treated with cryogenically resistant material, forming a band of cryogenically resistant material about the inner wall surface 24. In one or more embodiments, the bottom wall portion of the can 20 inner wall surface 24 is coated or treated with cryogenically resistant material, which may include a bottom portion of the vertical inner wall rising from the bottom of the can 20. In one or more embodiments, the inner wall surface 24 is coated or treated with cryogenically resistant material from just below the expected beverage fill line to the rim 28 of the can 20 or just below the rim 28.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as "comprise" and "comprises", and equivalent open-ended transitional phrases thereof like "including," "containing" and "having", encompasses all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

Lastly, the terminology used herein is for the purpose of describing particular embodiments only and is not intended to limit the scope of the present invention, which is defined solely by the claims. Accordingly, the present invention is not limited to that precisely as shown and described.

What is claimed is:

1. A method of protecting an inner wall surface of a vessel from damaging interaction with an additive added to the vessel, the method comprising:

providing the vessel at least part way filled with a liquid product;

applying a force on the vessel sufficient to create a change in shape of a surface of the liquid product;

starting a dwell time period at a predetermined time by sufficiently removing the force such that the force no longer creates the change in shape of a surface of the liquid product, the change in shape of the surface of the liquid product persists at least in part for a residual time period after removal of the force;

ending the dwell time period by reapplying the force sufficient to once again create a change in shape of a surface of the liquid product, the dwell time period being less than the residual time period; and providing sufficient containment of the additive by the change in shape of the surface of the liquid product to substantially prevent damaging interaction between the inner wall surface of the vessel and the additive for at least an additive reaction time period at the end of which the additive is rendered substantially incapable of producing damaging interaction to the inner wall surface of the vessel.

2. The method of claim 1 wherein applying the force comprises applying a torque to the vessel to rotate the vessel at a sufficient angular speed to produce the change in shape of the surface of the liquid, wherein the change in shape produces a concave liquid surface.

3. The method of claim 2 wherein the additive is contained within a low portion of the concave liquid surface to substantially prevent damaging interaction between the inner wall surface of the vessel and the additive.

4. The method of claim 3 wherein the additive is a cryogenic additive and the additive reaction time period is the amount of time required for a majority of the cryogenic additive to change phase into a gas.

5. The method of claim 4 wherein the majority is when at least 50% of the cryogenic additive changes phase into the gas.

6. The method of claim 2 wherein applying the force further comprises rotating the vessel containing the liquid product before adding the additive for a spin-up time period sufficient in length to impart a rotational motion on the liquid product sufficient to at least partially form the concave liquid surface.

7. The method of claim 2 wherein the sufficient angular speed of the vessel is at least 0.25 revolutions per second.

8. The method of claim 2 wherein the vessel is a cylindrical vessel and further includes an outer wall surface and an outer bottom surface, and wherein the cylindrical vessel is positioned on a conveyor of a packaging line with the outer bottom surface resting on the conveyor, and applying the torque to the cylindrical vessel to rotate the cylindrical vessel comprises contacting the outer wall surface with a portion of the conveyor system to impart a rotation on the vessel.

9. The method of claim 8 wherein the portion of the conveyor system is a rail configured to selectively contact the outer wall surface of the cylindrical vessel to cause rotation of the cylindrical vessel.

10. The method of claim 8 wherein the portion of the conveyor system imparts the rotation on the vessel relative to the conveyor due to the differences in speed of the conveyor and the portion of the conveyor system.

11. The method of claim 8 wherein the additive is a cryogenic liquefied gas, the packaging line includes a cryogenic doser nozzle movable in substantial unison with the cylindrical vessel when adding the cryogenic liquefied gas to the liquid product.

12. The method of claim 8 wherein after filling the cylindrical vessel with the liquid product and adding the additive a lid is hermetically sealed to the cylindrical vessel, the cylindrical vessel is continuously rotated during the additive reaction time period.

13. The method of claim 2 wherein the change in shape produces the concave liquid surface substantially in the form of a paraboloid of revolution.

14. The method of claim 1 further comprising applying a manufacturing action during the dwell period wherein the manufacturing action comprises one or more of applying a lid to the vessel, transitioning the vessel from a conveyor to a lid sealing machine where a lid is sealed to the vessel to seal the liquid product within the vessel, and transitioning the vessel from the lid sealing machine to the conveyor.

15. The method of claim 1 wherein the additive reaction time period is at least 4 seconds.

* * * * *